(12) United States Patent
Seebald (10) Patent No.: US 10,175,006 B2
(45) Date of Patent: Jan. 8, 2019

(54) HEAT TRANSFER ELEMENTS FOR A CLOSED CHANNEL ROTARY REGENERATIVE AIR PREHEATER

(71) Applicant: ARVOS Ljungstrom LLC, Wellsville, NY (US)

(72) Inventor: James David Seebald, Wellsville, NY (US)

(73) Assignee: ARVOS Ljungstrom LLC, Wellsville, NY (US)

( * ) Notice: Subject to any disclaimer, the term of this patent is extended or adjusted under 35 U.S.C. 154(b) by 355 days.

(21) Appl. No.: 14/089,139

(22) Filed: Nov. 25, 2013

(65) Prior Publication Data
US 2015/0144293 A1 May 28, 2015

(51) Int. Cl.
| F28D 17/00 | (2006.01) |
| F28D 19/04 | (2006.01) |
| F28F 3/04 | (2006.01) |
| B23P 15/26 | (2006.01) |

(52) U.S. Cl.
CPC ............ *F28D 19/044* (2013.01); *F28F 3/046* (2013.01); *B23P 15/26* (2013.01); *Y10T 29/49357* (2015.01)

(58) Field of Classification Search
CPC ...... F28D 19/04; F28D 19/041; F28D 19/042; F28D 19/044; F28F 3/025; F28F 3/046; F28F 2215/04
USPC .......................................................... 165/8
See application file for complete search history.

(56) References Cited

U.S. PATENT DOCUMENTS

| 682,607 | A | 9/1901 | Eck |
| 1,429,149 | A | 9/1922 | Lawrence |
| 1,450,351 | A | 4/1923 | Beran |
| 1,875,188 | A | 4/1923 | Beran |
| 1,477,209 | A | 12/1923 | Cowan |
| 1,524,280 | A | 1/1925 | Bancel |
| 1,894,956 | A | 1/1933 | Kerr |
| 1,915,742 | A | 6/1933 | Mautsch |

(Continued)

FOREIGN PATENT DOCUMENTS

| CA | 1061653 A | 9/1979 |
| CA | 2759895 A1 | 11/2010 |

(Continued)

OTHER PUBLICATIONS

International Search Report for corresponding PCT/US2016/056209 dated May 22, 2017.

*Primary Examiner* — Jason Thompson
(74) *Attorney, Agent, or Firm* — Murtha Cullina LLP (57) ABSTRACT

A closed channel rotary regenerative air preheater includes element supporting baskets that have first heat transfer elements having first arches arranged in an alternating order with second heat transfer elements having second arches. Each of the first arches has a first apex and a concave segment extending therefrom and each of the second arches has a second apex and a convex segment extending therefrom. Each of the convex segments is nested in a respective one of the concave segments thereby defining a contact line therebetween which extends an entire length of the first heat transfer element and the second heat transfer element. Adjacent pairs of the contact lines define a closed passageway therebetween and between the first heat transfer element and the second heat transfer element for heat transfer fluid flow therethrough.

5 Claims, 7 Drawing Sheets

(56) References Cited

U.S. PATENT DOCUMENTS

| | | | |
|---|---|---|---|
| 1,987,798 A | 1/1935 | Ruppricht | |
| 2,023,965 A | 12/1935 | Lysholm | |
| 2,042,017 A | 5/1936 | Orchard | |
| 2,102,936 A | 12/1937 | Bailey | |
| 2,160,677 A | 5/1939 | Romanoff | |
| 2,313,081 A | 3/1943 | Ljungstrom | |
| 2,432,198 A * | 12/1947 | Karlsson | F28D 19/044 165/10 |
| 2,438,851 A | 3/1948 | Gates | |
| 2,596,642 A | 5/1952 | Boestad | |
| 2,782,009 A | 2/1957 | Rippingille | |
| 2,796,157 A | 6/1957 | Ginsburg | |
| 2,940,736 A * | 6/1960 | Odman | F28D 19/042 165/10 |
| 2,983,486 A | 5/1961 | Rosenberg | |
| 3,019,160 A | 1/1962 | Slezak et al. | |
| 3,111,982 A | 11/1963 | Ulbricht | |
| 3,158,527 A | 11/1964 | Faccin et al. | |
| 3,183,963 A | 5/1965 | Mondt | |
| 3,216,494 A | 11/1965 | Goodman | |
| 3,240,266 A | 3/1966 | Corbel et al. | |
| 3,260,511 A | 7/1966 | Greer | |
| 3,262,490 A | 7/1966 | Olson | |
| 3,317,222 A | 5/1967 | Maretzo | |
| 3,372,743 A | 3/1968 | Pall et al. | |
| 3,373,798 A | 3/1968 | Brummett | |
| 3,415,502 A | 12/1968 | Munters | |
| 3,452,814 A | 7/1969 | Malewicz | |
| 3,490,523 A | 1/1970 | Esmond | |
| 3,523,058 A | 8/1970 | Shick | |
| 3,532,157 A * | 10/1970 | Hubble | F28D 19/042 165/10 |
| 3,540,529 A | 11/1970 | Umino et al. | |
| 3,542,635 A | 11/1970 | Parker | |
| 3,574,103 A | 4/1971 | Latkin | |
| 3,674,620 A | 7/1972 | McCarthy et al. | |
| 3,726,408 A | 4/1973 | Gewiss | |
| 3,759,323 A | 9/1973 | Dawson et al. | |
| 3,825,412 A | 7/1974 | Mullender | |
| 3,830,684 A | 8/1974 | Hamon | |
| 3,887,664 A | 6/1975 | Regehr | |
| RE28,534 E | 8/1975 | Ame | |
| 3,901,309 A | 8/1975 | Thebert | |
| 3,940,966 A | 3/1976 | Deane | |
| 3,941,185 A | 3/1976 | Henning | |
| 3,952,077 A | 4/1976 | Wigley | |
| 3,963,810 A | 6/1976 | Holmberg et al. | |
| 4,034,135 A | 7/1977 | Passmore | |
| 4,049,855 A | 9/1977 | Cogan | |
| 4,061,183 A * | 12/1977 | Davis | F28D 19/042 165/10 |
| 4,098,722 A | 7/1978 | Cairns et al. | |
| 4,125,149 A * | 11/1978 | Kritzler | F28F 3/046 165/10 |
| 4,144,369 A | 3/1979 | Wass | |
| 4,182,402 A | 1/1980 | Adrian | |
| 4,202,449 A | 5/1980 | Bendt | |
| 4,228,847 A | 10/1980 | Lindahl | |
| 4,296,050 A | 10/1981 | Meier | |
| 4,320,073 A | 3/1982 | Bugler | |
| 4,337,287 A | 6/1982 | Falkenberg | |
| 4,343,355 A | 8/1982 | Goloff et al. | |
| 4,344,899 A | 8/1982 | Monjoie | |
| 4,361,426 A | 11/1982 | Carter et al. | |
| 4,363,222 A | 12/1982 | Cain | |
| 4,374,542 A | 2/1983 | Bradley | |
| 4,396,058 A | 8/1983 | Kurschner et al. | |
| 4,409,274 A | 10/1983 | Chaplin et al. | |
| 4,423,772 A | 1/1984 | Dahlgren | |
| 4,449,573 A | 5/1984 | Pettersson et al. | |
| 4,472,473 A | 9/1984 | Davis et al. | |
| 4,501,318 A | 2/1985 | Hebrank | |
| 4,512,389 A | 4/1985 | Goetschius | |
| 4,518,544 A | 5/1985 | Carter et al. | |
| 4,553,458 A * | 11/1985 | Schoonover | B23D 33/006 83/210 |
| 4,605,996 A | 8/1986 | Payne | |
| 4,633,936 A | 1/1987 | Nilsson | |
| 4,668,443 A | 5/1987 | Rye | |
| 4,676,934 A | 6/1987 | Seah | |
| 4,689,261 A | 8/1987 | Ahnstrom | |
| 4,744,410 A | 5/1988 | Groves | |
| 4,750,553 A | 6/1988 | Pohl et al. | |
| 4,769,968 A | 9/1988 | Davis et al. | |
| 4,791,773 A | 12/1988 | Taylor | |
| 4,842,920 A | 6/1989 | Banai et al. | |
| 4,847,019 A | 7/1989 | McNab | |
| 4,857,370 A | 8/1989 | Overbergh et al. | |
| 4,858,684 A | 8/1989 | Brucher et al. | |
| 4,862,666 A | 9/1989 | Kero | |
| 4,876,134 A | 10/1989 | Saitoh et al. | |
| 4,906,510 A | 3/1990 | Todor, Jr. et al. | |
| 4,915,165 A | 4/1990 | Dahlgren et al. | |
| 4,930,569 A | 6/1990 | Harder | |
| 4,950,430 A | 8/1990 | Chen et al. | |
| 4,953,629 A | 9/1990 | Karlsson et al. | |
| 4,974,656 A | 12/1990 | Judkins | |
| 4,981,732 A | 1/1991 | Hoberman | |
| 5,085,268 A | 3/1992 | Nilsson | |
| 5,101,892 A | 4/1992 | Takeuchi et al. | |
| 5,150,596 A | 9/1992 | Hunt et al. | |
| 5,308,677 A | 5/1994 | Renna | |
| 5,314,006 A | 5/1994 | Kaastra et al. | |
| 5,314,738 A | 5/1994 | Ichikawa | |
| 5,318,102 A | 6/1994 | Spokoyny et al. | |
| 5,333,482 A | 8/1994 | Dunlap et al. | |
| 5,380,579 A | 1/1995 | Bianchi | |
| 5,413,741 A | 5/1995 | Buchholz et al. | |
| 5,413,872 A | 5/1995 | Faigle | |
| 5,441,793 A | 8/1995 | Siiess | |
| 5,489,463 A | 2/1996 | Paulson | |
| 5,544,703 A | 8/1996 | Joel et al. | |
| H1621 H | 12/1996 | Ray | |
| 5,598,930 A | 2/1997 | Leone et al. | |
| 5,600,928 A | 2/1997 | Hess et al. | |
| 5,605,655 A | 2/1997 | Ishihara et al. | |
| 5,609,942 A | 3/1997 | Ray | |
| 5,647,741 A | 7/1997 | Bunya et al. | |
| 5,667,875 A | 9/1997 | Usui | |
| 5,747,140 A | 5/1998 | Heerklotz | |
| 5,792,539 A | 8/1998 | Hunter | |
| 5,803,158 A | 9/1998 | Harder et al. | |
| 5,836,379 A * | 11/1998 | Counterman | F28D 19/044 165/10 |
| 5,899,261 A | 5/1999 | Brzytwa et al. | |
| 5,979,050 A | 11/1999 | Counterman et al. | |
| 5,983,985 A * | 11/1999 | Counterman | B21D 13/04 165/10 |
| 6,019,160 A | 2/2000 | Chen | |
| 6,145,582 A | 11/2000 | Bolle et al. | |
| 6,212,907 B1 | 4/2001 | Billingham et al. | |
| 6,251,499 B1 | 6/2001 | Lehman et al. | |
| 6,253,833 B1 * | 7/2001 | Koster | F28D 19/044 165/10 |
| 6,280,824 B1 | 8/2001 | Insley et al. | |
| 6,280,856 B1 | 8/2001 | Anderson et al. | |
| 6,478,290 B1 | 11/2002 | Ender et al. | |
| 6,497,130 B2 | 12/2002 | Nilsson | |
| 6,516,871 B1 | 2/2003 | Brown et al. | |
| 6,544,628 B1 | 4/2003 | Aull et al. | |
| 6,660,402 B2 | 12/2003 | Tanabe | |
| 6,730,008 B1 | 5/2004 | Liang | |
| 6,764,532 B1 | 7/2004 | Cheng | |
| 7,044,206 B2 | 5/2006 | Sabin et al. | |
| 7,117,928 B2 | 10/2006 | Chen | |
| 7,347,351 B2 | 5/2008 | Slattery | |
| 7,555,891 B2 | 7/2009 | Muller et al. | |
| 7,654,067 B2 | 2/2010 | Waitron | |
| 7,938,627 B2 | 5/2011 | Muller | |
| 8,296,946 B2 | 10/2012 | Wieres et al. | |
| 8,323,778 B2 | 12/2012 | Webb et al. | |
| 9,200,853 B2 | 12/2015 | O'Boyle et al. | |
| 2002/0043362 A1 | 4/2002 | Wilson | |

(56) References Cited

U.S. PATENT DOCUMENTS

| | | |
|---|---|---|
| 2003/0024697 A1 | 2/2003 | Matsuzaki |
| 2003/0178173 A1 | 9/2003 | Harting et al. |
| 2005/0274012 A1 | 12/2005 | Hodgson et al. |
| 2007/0017664 A1 | 1/2007 | Beamer et al. |
| 2009/0065185 A1 | 3/2009 | Jekerle |
| 2010/0218927 A1 | 9/2010 | Cooper et al. |
| 2010/0258284 A1 | 10/2010 | Krantz |
| 2010/0282437 A1 | 11/2010 | Birmingham et al. |
| 2011/0042035 A1 | 2/2011 | Seeblad |
| 2012/0305217 A1 | 12/2012 | Cowburn et al. |
| 2013/0327513 A1 | 12/2013 | Franz et al. |
| 2014/0054003 A1 | 2/2014 | O'Boyle et al. |
| 2014/0090822 A1 | 4/2014 | Seeblad |
| 2015/0144293 A1 | 5/2015 | Seeblad |

FOREIGN PATENT DOCUMENTS

| | | |
|---|---|---|
| CN | 101210780 A | 7/2008 |
| EP | 0150913 A2 | 8/1985 |
| EP | 0805331 A2 | 11/1997 |
| EP | 0945195 A2 | 9/1999 |
| EP | 1154143 A1 | 11/2001 |
| EP | 1884732 A2 | 2/2008 |
| EP | 2427712 A1 | 3/2012 |
| EP | 2700893 A1 | 2/2014 |
| FR | 775271 A | 12/1934 |
| FR | 1219505 A | 5/1960 |
| GB | 177780 | 2/1923 |
| GB | 992413 | 5/1965 |
| GB | 1339542 | 12/1973 |
| GB | 1567239 | 5/1980 |
| JP | 83112 | 9/1929 |
| JP | 26-006787 | 10/1951 |
| JP | S52-000746 A | 1/1977 |
| JP | S54-085547 U | 6/1979 |
| JP | S56-075590 U | 6/1981 |
| JP | s57-154874 U | 9/1982 |
| JP | 93590 | 6/1987 |
| JP | 158996 | 7/1987 |
| JP | 01-273996 | 11/1989 |
| JP | 08-101000 A | 4/1996 |
| JP | 09-280764 A | 10/1997 |
| JP | 10-328861 A | 12/1998 |
| JP | 11-294986 A | 10/1999 |
| JP | 2001-516866 A | 10/2001 |
| JP | 2003-200223 A | 7/2003 |
| JP | 2004-093036 A | 3/2004 |
| KR | 100417321 B1 | 2/2004 |
| KR | 1020080063271 | 1/2013 |
| WO | 98/14742 A1 | 4/1998 |
| WO | 98/22768 A1 | 5/1998 |
| WO | WO9914543 | 3/1999 |
| WO | 00/49357 A1 | 8/2000 |
| WO | 2007012874 A1 | 2/2007 |
| WO | 2010129092 A1 | 11/2010 |
| WO | 2012000767 A2 | 1/2012 |

* cited by examiner

HEAT TRANSFER ELEMENTS FOR A CLOSED CHANNEL ROTARY REGENERATIVE AIR PREHEATER

FIELD OF THE DISCLOSURE

The present disclosure relates to heat transfer elements for a regenerative air preheater, and methods of manufacturing and using such heat transfer elements in regenerative air preheaters. More specifically, the present disclosure relates to closed channel heat transfer elements, methods of their manufacture and methods of their use in rotary regenerative air preheaters for increased heat transfer and decreased associated costs.

BACKGROUND OF THE DISCLOSURE

Rotary regenerative air preheaters are commonly used to transfer heat from combustion furnace flue gas to air used in the combustion furnace as combustion air. A conventional rotary regenerative air preheater 10, such as that illustrated in FIG. 1 includes a rotor 12 mounted within an interior 14a of a housing 14. The housing 14 defines a flue gas inlet duct 16 and a flue gas outlet duct 18 for a flow represented by arrow 20 of heated combustion furnace flue gas FG through the air preheater 10. The housing 14 further defines an air inlet duct 22 and an air outlet duct 24 for a flow represented by arrow 26 of combustion air CA through the air preheater 10. The rotor 12 includes a plurality of radial partitions 28 or diaphragms defining compartments 30 therebetween for element supporting baskets (frames) 32 of heat transfer elements 34. The rotary regenerative air preheater 10 is divided into an air sector 38 and a flue gas sector 36 by sector plates 40, which extend across to "cap" open top end 42 and open bottom end 44 of housing 14 to partially enclose rotor 12 within interior 14a of housing 14.

Figure 2:
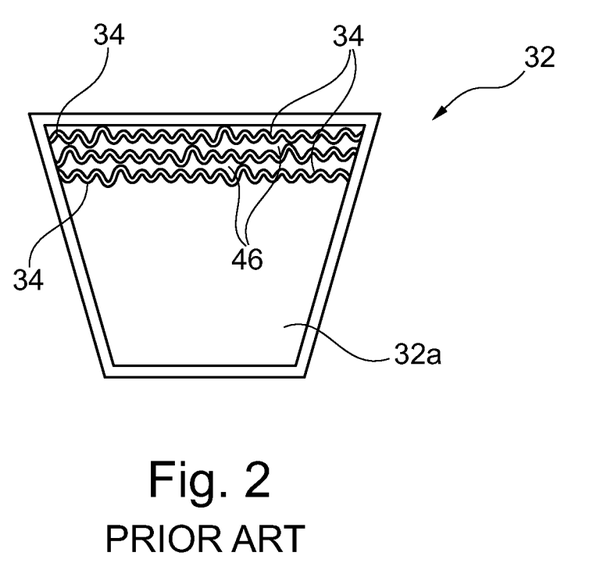
FIG. 2 is a schematic top plan view of a prior art element supporting basket including a few heat transfer elements.

FIG. 2 illustrates an element supporting basket 32 including a few heat transfer elements 34 stacked therein. While only a few heat transfer elements 34 are illustrated in FIG. 2 for purposes of clarity, it will be appreciated that interior 32a of the element supporting basket 32 will typically be filled with multiple heat transfer elements 34. As such, heat transfer elements 34 are closely stacked in a spaced relationship within interior 32a of element supporting basket 32 to form passageways 46 between the heat transfer elements 34 for the flow of combustion air CA or flue gas FG therethrough.

Figure 1:
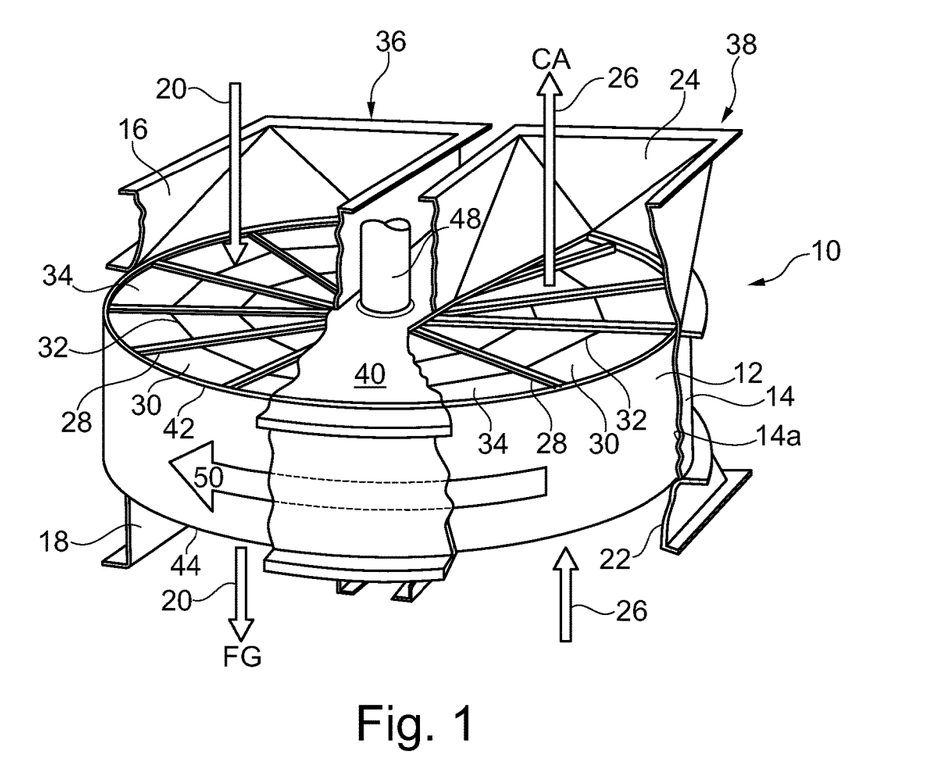
FIG. 1 is a partially broken away schematic perspective view of a prior art rotary regenerative air preheater.

Referring to FIGS. 1 and 2, the hot flue gas FG has a flow 20 through the gas sector 36 of the air preheater 10 transferring heat to the heat transfer elements 34 on the continuously rotating rotor 12. The heat transfer elements 34 in element supporting baskets 32 rotate about vertical axis 48, illustrated by arrow 50, out of gas sector 36 and into the air sector 38 of the air preheater 10. In air sector 38, combustion air CA has a flow 26 between the heat transfer elements 34. Combustion air CA is thereby heated by heat transfer elements 34. In other forms of rotary regenerative air preheaters, the heat transfer elements 34 remain stationary while the flue gas inlet duct 16/flue gas outlet duct 18 and air inlet duct 22/air outlet duct 24 of housing 14 rotate. For examples of other heat transfer elements 34, reference is made to U.S. Pat. Nos. 2,596,642; 2,940,736; 4,396,058; 4,744,410; 4,553,458; and 5,836,379.

Although known heat transfer elements exhibit favorable heat transfer rates, the results can vary rather widely depending upon the specific design. For example, while various undulations in the heat transfer elements may provide an enhanced degree of heat transfer, they also may increase pressure drop across the air preheater. Ideally, undulations in the heat transfer elements induce a relatively high degree of turbulent flow in the fluid medium adjacent to the heat transfer elements, while the fluid medium not adjacent to the elements (i.e., the fluid near the center of the passageways) experience a lesser degree of turbulence, and therefore less resistance to flow and less pressure drop. However, attaining the optimum level of turbulence from the undulations can be difficult to achieve since both the heat transfer and the pressure drop tend to be proportional to the degree of turbulence produced by the undulations. An undulation design that increases heat transfer tends to also increase pressure drop, and a shape that decreases pressure drop tends to also decrease heat transfer.

Design of the heat transfer elements must also present a surface configuration that is readily cleanable. In cleaning heat transfer elements, soot blowers are typically used to deliver a blast of high-pressure air or steam through the passages between the stacked heat transfer elements to dislodge any particulate deposits from the surface thereof and carry the particulates away leaving a relatively clean surface. To accommodate soot blowing, it is advantageous for the heat transfer elements to be shaped such that when stacked in a basket the passageways are sufficiently open to provide a line of sight between the elements. Such arrangement allows the soot blower jet of air or steam to penetrate between the heat transfer elements for cleaning thereof. Some heat transfer elements do not provide for such open channels, and although they may have relatively good heat transfer and pressure drop characteristics, cleaning using conventional soot blowers is ineffective. Heat transfer elements with open channels also allow for the operation of a sensor for measuring the quantity of infrared radiation leaving the heat transfer element. Infrared radiation sensors can be used to detect the presence of a "hot spot", which is generally recognized as a precursor to a fire in the basket. Such sensors, commonly known as "hot spot" detectors, are useful in preventing the onset and growth of fires. Heat transfer elements formed and arranged without open channels prevent infrared radiation from leaving the heat transfer element thereby preventing detection by a hot spot detector.

Thus, there is a need for a rotary regenerative air preheater with heat transfer elements that provide decreased pressure drop for a given amount of heat transfer, provide surfaces cleanable by a soot blower and provide an arrangement compatible with hot spot detector use.

SUMMARY

The present disclosure is directed to a closed channel air preheater equipped with element supporting baskets and heat transfer elements, a method of making the subject closed channel air preheater, and a method of using the subject closed channel air preheater. As such, the subject closed channel rotary regenerative air preheater includes element supporting baskets with a plurality of first uniformly corrugated or undulated heat transfer elements, and a plurality of second spacer heat transfer elements. The first and second heat transfer elements are arranged to alternate one with the other within the element supporting baskets. The second spacer heat transfer elements define the spacing between first and second heat transfer elements and serve to close passageways or channels formed by contact between the first and second heat transfer elements as described in greater detail below. Contact between second heat transfer elements and first heat transfer elements is minimized to maximize heat transfer area or surfaces. Also, since the first heat transfer elements are uniformly corrugated or undulated, need for accurate positioning of the heat transfer elements to form closed channels is eliminated thus reducing associated costs. The subject closed channel rotary regenerative air preheater at least maintains heat transfer rates as compared to that of the prior art described above, while significantly reducing pressure drop and reducing heat transfer element fabrication complexity, thereby reducing costs associated therewith.

In summary, a closed channel rotary regenerative air preheater is provided that comprises element supporting baskets each supporting a plurality of first heat transfer elements arranged in an alternating order with a plurality of second heat transfer elements. The first heat transfer elements are fabricated to comprise uniform alternating longitudinally parallel arches. The second heat transfer elements are fabricated to comprise two uniform alternating longitudinally parallel adjacent arches with an interval of longitudinally parallel uniform undulations angled with respect to the two adjacent arches between each pair of adjacent arches. The adjacent arches of the second heat transfer elements define the spacing between the first heat transfer elements and the second heat transfer elements, and serve to close passageways formed therebetween for fluid flow therethrough. A peak-to-peak height of the arches of the first heat transfer elements is depicted as Hu and a peak-to-peak height of the adjacent arches of the second heat transfer elements is depicted as Hs, with the ratio of Hu:Hs approximately 1:2.5 to approximately 1:4.0. Further, the arches of the first heat transfer elements are parallel to a main direction of flow of fluid, the adjacent arches of the second heat transfer elements are parallel to a main direction of flow of fluid, and the uniform undulations of the second heat transfer elements are angled at approximately 20 degrees to approximately 50 degrees with respect to the main direction of flow of fluid. Optionally, one or more of the adjacent arches of the second heat transfer elements may include one or more hips or ridges for added strength.

A method of making a closed channel rotary regenerative air preheater is also provided comprising providing a rotary regenerative air preheater equipped with element supporting baskets, and fabricated from rigid material sheets first heat transfer elements having uniform alternating longitudinally parallel arches and sized for support within the element supporting baskets. Second heat transfer elements are likewise fabricated from rigid material sheets to have two uniform alternating longitudinally parallel adjacent arches with an interval of longitudinally parallel uniform undulations between each such pair of adjacent arches. The second heat transfer elements are also sized for support within the element supporting baskets. Once fabricated, the first heat transfer elements and the second heat transfer elements are arranged within the element supporting baskets in an alternating order with the adjacent arches of the second heat transfer elements defining the spacing between the first heat transfer elements and the second heat transfer elements. The adjacent arches of the second heat transfer elements likewise serve to close passageways between the first and second heat transfer elements to form closed channels for fluid flow therethrough. A peak-to-peak height of the arches of the first heat transfer elements is depicted as Hu and a peak-to-peak height of the adjacent arches of the second heat transfer elements is depicted as Hs, with the ratio of Hu:Hs approximately 1:2.5 to approximately 1:4.0. Furthermore, the arches of the first heat transfer elements are parallel to a main direction of flow of fluid, the adjacent arches of the second heat transfer elements are parallel to the main direction of flow of fluid, and the uniform undulations of the second heat transfer elements are angled at approximately 20 degrees to approximately 50 degrees with respect to the main direction of flow of fluid. Optionally, one or more of the adjacent arches of the second heat transfer elements may include one or more hips or ridges for added strength.

Still further, a method of using a closed channel rotary regenerative air preheater is provided comprising providing a rotary regenerative air preheater equipped with element supporting baskets. Within the element supporting baskets, first heat transfer elements having uniform alternating longitudinally parallel arches are arranged in an alternating order with second heat transfer elements. The second heat transfer elements have two uniform alternating longitudinally parallel adjacent arches with an interval of longitudinally parallel uniform undulations angled between each such pair of adjacent arches. Adjacent arches of the second heat transfer elements defining the spacing between the alternating first heat transfer elements and second heat transfer elements. Also, adjacent arches of the second heat transfer elements close passageways to form closed channels for fluid flow therethrough. As such, fluid flows through the closed channels to transfer heat from flue gas FG to air prior to use of the air as combustion air in a combustion furnace. A peak-to-peak height of the arches of the first heat transfer elements is depicted as Hu and a peak-to-peak height of the adjacent arches of the second heat transfer elements is depicted as Hs, with the ratio of Hu:Hs approximately 1:2.5 to approximately 1:4.0. The arches of the first heat transfer elements are parallel to a main direction of flow of fluid, the adjacent arches of the second heat transfer elements are parallel to the main direction of flow of fluid, and the uniform undulations of the second heat transfer elements are angled at approximately 20 degrees to approximately 50 degrees with respect to the main direction of flow of fluid. Optionally, one or more of the adjacent arches of the second heat transfer elements include one or more hips or ridges for added strength.

Further objects and features of the subject closed channel rotary regenerative air preheater and methods associated therewith will be apparent from the following detailed description and claims.

BRIEF DESCRIPTION OF THE DRAWINGS

The subject closed channel rotary regenerative air preheater with first heat transfer elements and second heat transfer elements for alternating arrangement within the closed channel rotary regenerative air preheater is disclosed in more detail below with reference to the appended drawings wherein.

DETAILED DESCRIPTION

As noted above, FIGS. 1 and 2 illustrate a prior art rotary regenerative air preheater 10 equipped with an element supporting basket 32 illustrated as including only a few heat transfer elements 34 for purposes of clarity.

Figure 3:
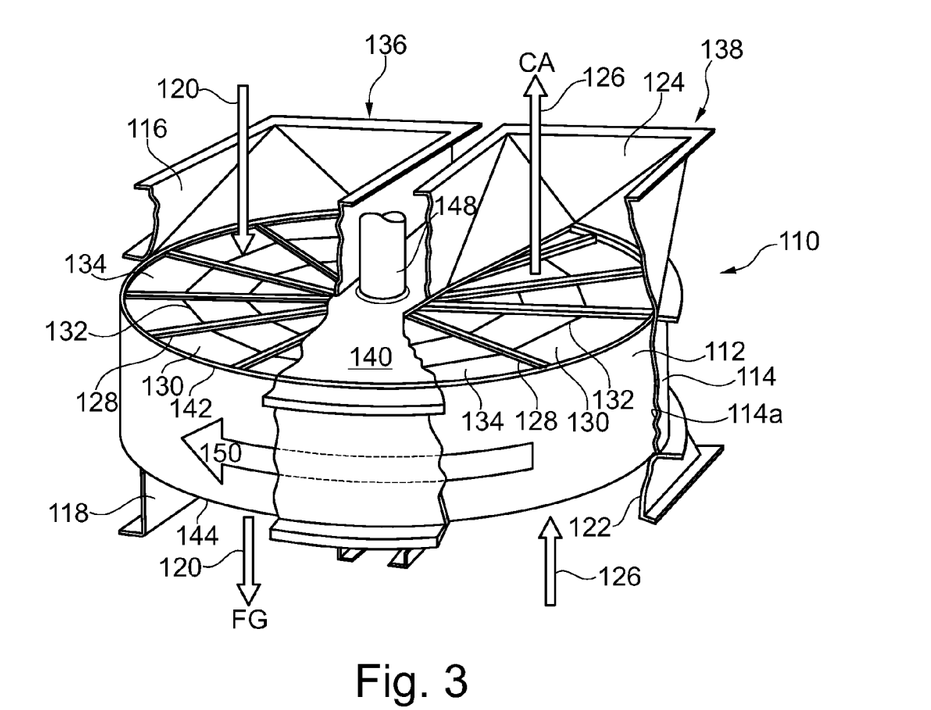
FIG. 3 is a partially broken away schematic perspective view of a closed channel rotary regenerative air preheater according to the subject disclosure.

Illustrated in FIG. 3, is the present closed channel rotary regenerative air preheater 110 used to transfer heat from a combustion furnace flue gas FG to air used in the combustion furnace (not shown) as combustion air CA. Closed channel rotary regenerative air preheater 110, hereinafter referred to as "preheater 110", includes a rotor 112 mounted within an interior 114a of a housing 114. The housing 114 defines a flue gas inlet duct 116 and a flue gas outlet duct 118 for a flow represented by arrow 120 of heated combustion furnace flue gas FG through the preheater 110. The housing 114 further defines an air inlet duct 122 and an air outlet duct 124 for a flow represented by arrow 126 of air for use as combustion air CA through the preheater 110. The rotor 112 includes a plurality of radial partitions 128 or diaphragms defining compartments 130 therebetween for element supporting baskets (frames) 132 for heat transfer elements 134 support. The preheater 110 is divided into an air sector 138 and a flue gas sector 136 by sector plates 140, which extend across to "cap" open top end 142 and open bottom end 144 of housing 114 to partially enclose rotor 112 within interior 114a of housing 114.

Figure 4:
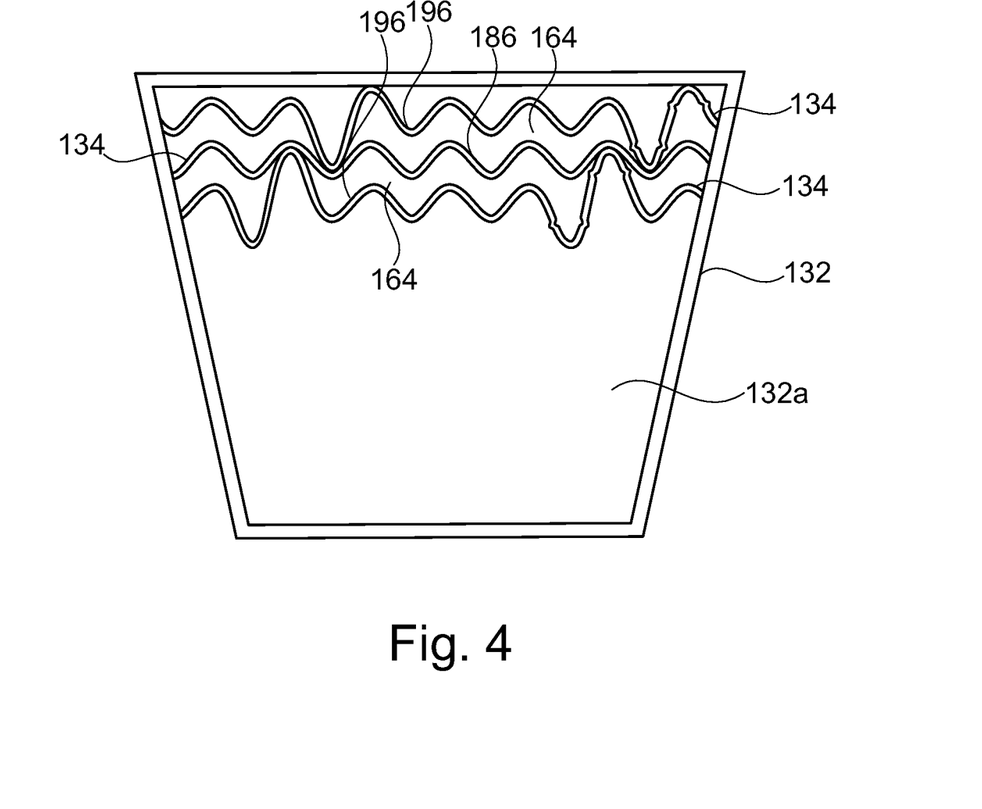
FIG. 4 is a schematic top plan view of an element supporting basket including a few heat transfer elements according to the subject disclosure.

FIG. 4 illustrates an element supporting basket 132 including a few heat transfer elements 134 stacked therein. While only a few heat transfer elements 134 are illustrated in FIG. 4 for purposes of clarity, it will be appreciated that interior 132a of the element supporting basket 132 will typically be filled with a plurality of heat transfer elements 134. As such, heat transfer elements 134 are closely stacked in a spaced relationship within interior 132a of element supporting basket 132 to form closed passageways or channels 164 between the heat transfer elements 134 for the flow of fluid, i.e., combustion air CA or flue gas FG, therethrough.

Referring to FIGS. 3 and 4, the hot flue gas FG has a flow 120 through the gas sector 136 of the preheater 110 transferring heat to the heat transfer elements 134 on the continuously rotating rotor 112. The heat transfer elements 134 in element supporting baskets 132 rotate about vertical axis 148, illustrated by arrow 150, out of gas sector 136 and into the air sector 138 of the preheater 110. In air sector 138, combustion air CA has a flow 126 between the heat transfer elements 134. Combustion air CA is thereby heated by heat transfer elements 134. In other forms of rotary regenerative air preheaters, the heat transfer elements 134 remain stationary while the flue gas inlet duct 116/flue gas outlet duct 118 and air inlet duct 122/air outlet duct 124 of housing 114 rotate. As noted, the present preheater 110 is equipped with element supporting baskets 132 best illustrated in FIG. 4. Element supporting baskets 132 support a plurality of heat transfer elements 134. Typically, each element supporting basket 132 supports approximately 50 to approximately 200 heat transfer elements 134. However, for purposes of clarity, element supporting basket 132 is illustrated in FIG. 4 with but a few heat transfer elements 134.

Figure 5:
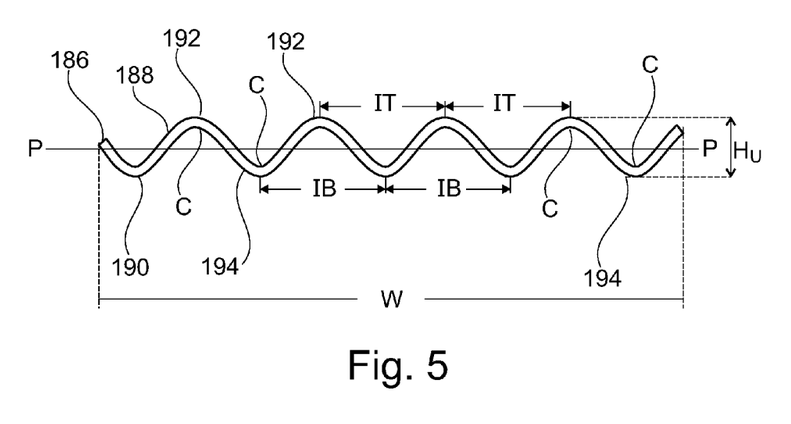
FIG. 5 is a schematic side view of a first heat transfer element according to the subject disclosure.

According to the present disclosure, element supporting baskets 132 support two different types of heat transfer elements 134. One type of heat transfer element 134 is first heat transfer element 186, hereinafter referred to as "element 186". Element 186 is best illustrated in FIG. 5. Element 186 is formed from a relatively thin and relatively rigid sheet metal material having a length L (FIG. 7) and width W capable of being rolled or stamped to the desired corrugated configuration. As such, element 186 has an overall plane P (i.e., straight central plane) with the element 186 having a top surface 188 and a bottom surface 190. Element 186 is uniformly corrugated or undulated. As such, a series of arches 192 having arcuate apexes, the arches 192 are at consistently spaced top intervals IT (e.g., a linear distance) along width W of element 186 extend beyond plane P in the direction of top surface 188. Likewise, midway between top intervals IT, a series of opposed arches 194 having arcuate apexes, the arches 194 are at consistently spaced bottom intervals IB (e.g., another linear distance) along width W of element 186 extend beyond plane P in the direction of bottom surface 190. Midway between each arch 192 and midway between each arch 194 is an available concave contact area (e.g., concave segment) C. Opposed arches 192 and 194 extend parallel one to another longitudinally the length L of element 186 and approximately parallel to a main direction of fluid flow past element 186. The peak-to-peak height between arches 192 and arches 194 is designated Hu.

Figure 6:
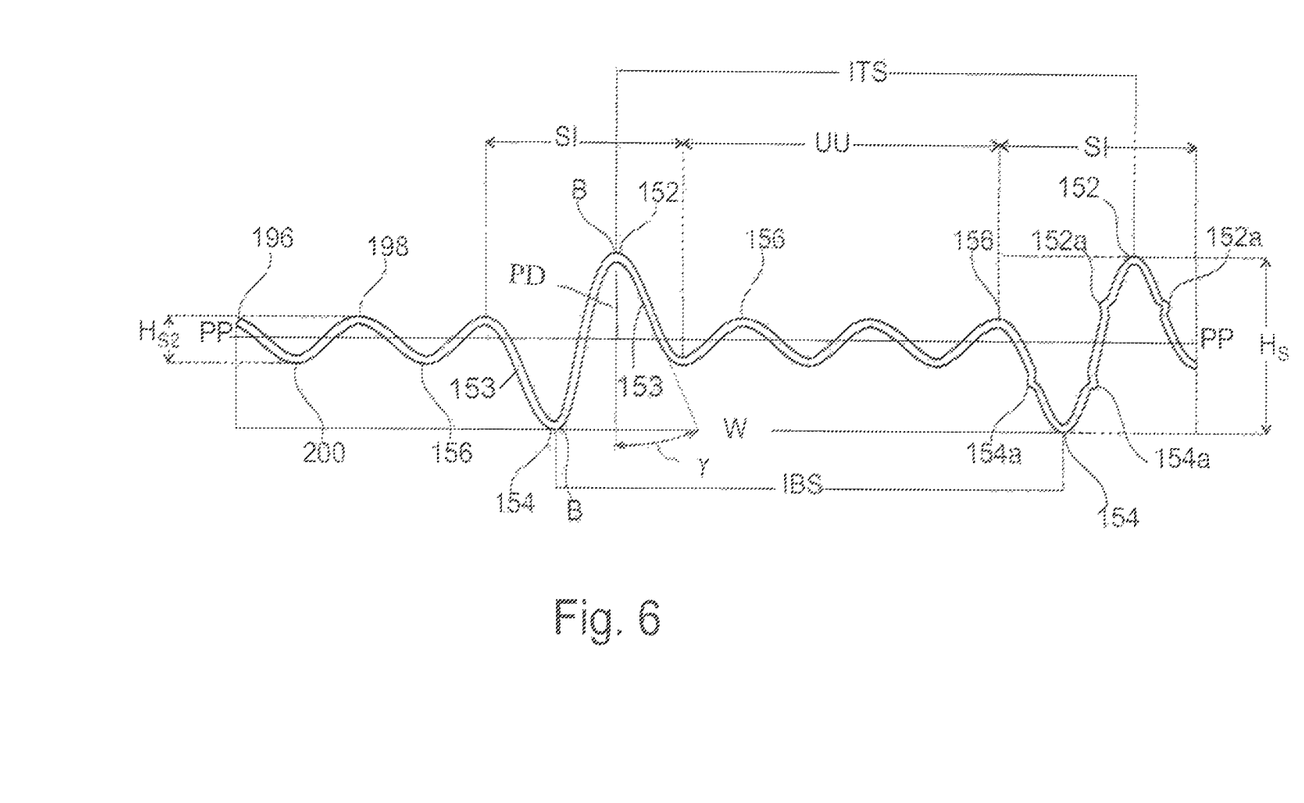
FIG. 6 is a schematic side view of a second heat transfer element according to the subject disclosure.

The second type of heat transfer element 134 is second heat transfer element 196, hereinafter referred to as "element 196". Element 196 is best illustrated in FIG. 6. Like element 186, element 196 is formed from relatively thin, relatively rigid, sheet metal material having a length L (FIG. 7) and width W capable of being rolled or stamped to the desired corrugated configuration. As such, element 196 has an overall plane PP (i.e., straight central plane parallel to the overall plane P of the element 186) with the element 196 having a top surface 198 and a bottom surface 200. A series of arches 152 at consistently spaced intervals ITS (i.e., linear distance) along width W of element 196 extend beyond plane PP in the direction of top surface 198. Likewise, adjacent each arch 152 is an arch 154. As such, a series of opposed arches 154 at consistently spaced bottom intervals IBS (i.e., linear distance) along width W of element 196 extend beyond plane PP in the direction of bottom surface 200. These opposed adjacent arches 152 and 154 each have an apex B (i.e., an arcuate apex having a convex segment) and together form an arch pair. Adjacent arches 152 and 154 extend parallel one to another longitudinally the length L of element 196 and approximately parallel to the main direction of fluid flow past element 196. The convex segments of the arches B transition into a flat section 153 that is configured at an non-zero angle γ relative to a perpendicular line PD that is perpendicular to the plane PP. Optionally, arches 152 and/or 154 may include one or more hips or ridges 152a, 154a, for added strength thereof. The peak-to-peak height between arches 152 and 154 is designated Hs. The ratio of Hu to Hs is approximately 1:2.5 or approximately 1:4.0.

Between pairs of opposed arches 152 and 154 of element 196 are uniform undulations 156. For each pair of opposed arches 152 and 154 of element 196 forming interval SI are approximately 3 to 5 uniform undulations 156 forming interval UU. Hence, approximately 15 to 25 percent of the width W of element 196 forms opposed arches 152 and 154, or intervals SI, and approximately 75 to 85 percent of the width of element 196 forms uniform undulations 156, or intervals UU. Uniform undulations 156 between opposed arches 152 and 154 extend parallel one to another longitudinally at an oblique angle of approximately 20 degrees to approximately 50 degrees with respect to opposed adjacent arches 152 and 154. The peak-to-peak height of uniform undulations 156 is designated Hs2. Hs2 is approximately equal to that of Hu. The flat section 153 transitions into the interval of longitudinally parallel uniform undulations 156.

Figure 7:
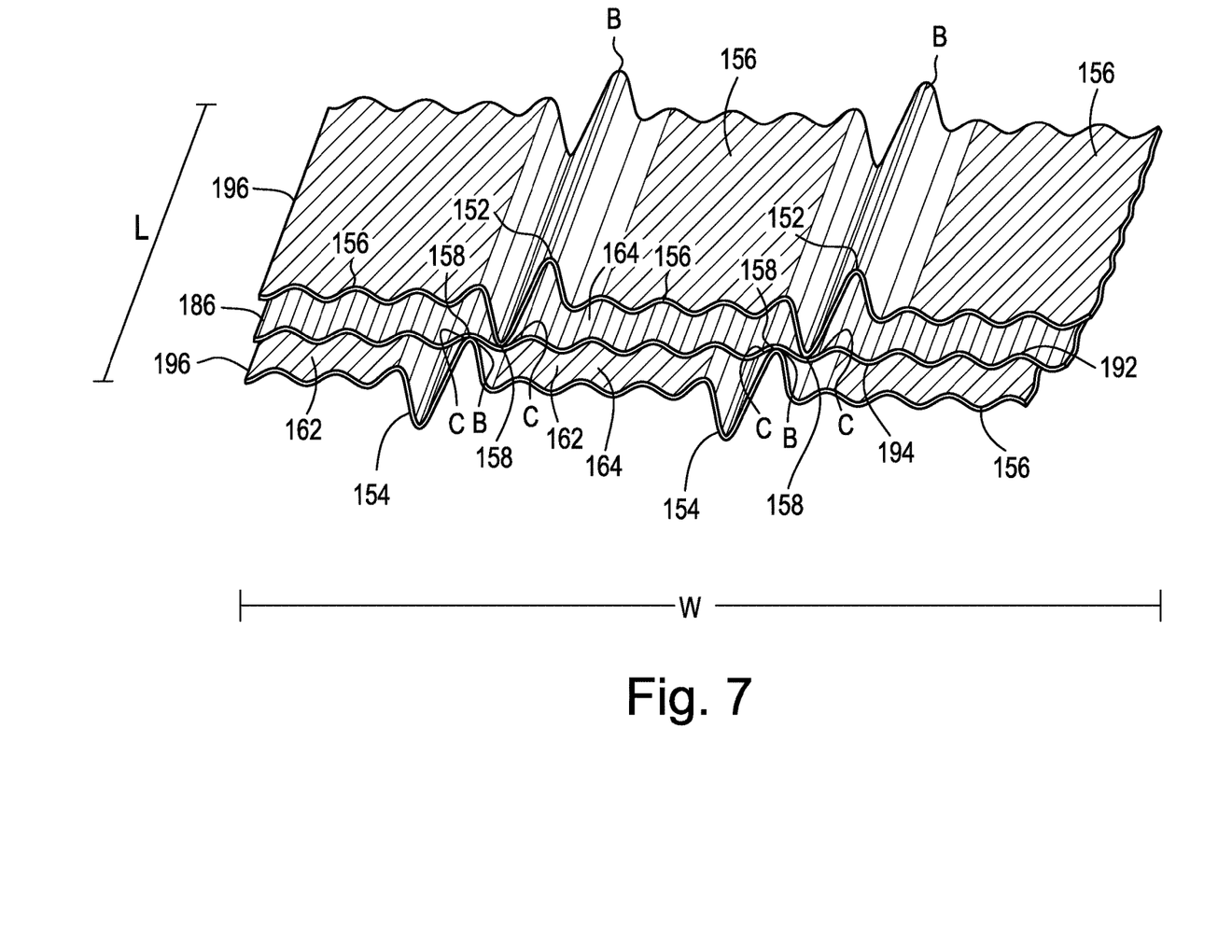
FIG. 7 is a schematic perspective side view of an arrangement of the first heat transfer elements of FIG. 3 in contact with the second heat transfer elements of FIG. 4 according to the subject disclosure.

Opposed adjacent arches 152 and 154 define the spacing between elements 186 and elements 196. Elements 186 and 196 are arranged in an alternating order with one another within element supporting baskets 132. As best illustrated in FIG. 7, the apex B of each of the arches 152 and 154 of elements 196 contact an available contact area C of elements 186 to form a contact point (e.g., contact line) 158. Hence, interior area 162 extending between adjacent contact points 158 form closed passageways or channels 164 such that the contact lines 158 are spaced apart from one another by a predetermined linear distance (e.g., intervals ITS or IBS) along a common plane parallel to the straight central second plane PP when the elements 186 and 196 are arranged in an alternating order within element supporting basket 132.

Another aspect of the present invention, the width of each of the arches 192 and 194 preferably differ from the width of each of the uniform undulations 156. As one of the overall objectives, the present invention is to create an optimal amount of turbulence near the surface of the elements 186 and 196. Hence, the reason arches 192 and 194 extend longitudinally parallel to fluid flow, whereas undulations 156 extend longitudinally at an angle of approximately 20 to 50 degrees with respect to fluid flow. In addition, arch/undulation widths can also affect the quantity of surface area provided by the elements 186, 196. This surface area of elements 186, 196 also impacts the amount of heat transfer between the fluids, FG, CA, and the elements, 186, 196.

Wind tunnel tests have surprisingly shown that replacing the conventional heat transfer elements 34 with alternating elements 186 and 196 as herein disclosed, can reduce the pressure drop significantly (about 14%) while maintaining the same rate of heat transfer and fluid flow. This translates to a significant cost savings because reducing the pressure drop of the combustion air CA and the flue gas FG as they flow through the air preheater 110 reduces the electrical power consumed by fans (not shown) used to force the combustion air CA and the flue gas FG to flow through the air preheater 110.

While not wanting to be bound by theory, it is believed that the differences between arches 192, 194 and uniform undulations 156 encountered by the heat transfer medium as it flows between the elements 186, 196, creates more turbulence in the fluid adjacent to the surfaces 188, 190, 198, 200, of the elements 186,196, and less turbulence nonadjacent to the surfaces 188, 190, 198, 200, in the relatively open passageways 164 that are farther away from the surfaces 188, 190, 198, 200, of elements 186, 196. The higher level of turbulence in fluid adjacent to the surfaces 188, 190, 198, 200 increases the rate of heat transfer between the fluid and the elements 186, 196. The lower level of turbulence in the relatively open closed passageways or channels 164 serves to reduce air preheater 110 pressure drop as the fluid flows through the closed passageways or channels 164.

The significant amount of heat transfer with the significantly reduced pressure drop performance (about 14% reduction) of the alternating elements 186 and 196 of the present disclosure also has the advantage that the angle of the uniform undulations 156 and the main flow direction of the heat transfer fluid can be adjusted. Adjustments from about 20 degrees to about 50 degrees may be made to increase heat transfer fluid turbulence to maintain an equal amount of heat transfer while still having significantly reduced pressure drop performance.

Furthermore, because the present air preheater 110 with relatively open closed passageways or channels 164 provide a relatively clear line-of sight between the elements 186 and 196, the present air preheater 110 is compatible with an infrared radiation (hot spot) detector (not shown) and cleaning soot blowers (not shown).

A method of making the subject disclosed air preheater involves providing a rotary regenerative air preheater 110 with element supporting baskets' 132, fabricating from a rigid sheet material elements 186 having uniform alternating longitudinally parallel arches 192 and 194 and sized for support within element supporting basket 132, fabricating from a rigid sheet material elements 196 of uniform alternating longitudinally parallel arches 152 and 154 having an interval of longitudinally parallel uniform undulations 156 angled with respect to arches 152 and 154 between each pair of arches 152 and 154 and sized for support within element supporting baskets 132, and placing elements 186 and 196 in the element supporting basket 132 in an order alternating between elements 186 and elements 196 with parallel arches 152 and 154 defining the spacing between elements 186 and 196 and forming closed passageways or channels 164 for fluid flow therethrough.

A method of using the subject disclosed air preheater involves providing a rotary regenerative air preheater 110 with element supporting baskets 132, fabricating from a rigid sheet material elements 186 of uniform alternating longitudinally parallel arches 192 and 194 sized for support within the element supporting baskets 132, fabricating from a rigid sheet material elements 196 of uniform alternating longitudinally parallel arches 152 and 154 having an interval of longitudinally parallel uniform undulations 156 angled with respect to arches 152 and 154 between each pair of arches 152 and 154 and sized for support within the element supporting baskets 132, placing elements 186 and 196 in the element supporting basket 132 in an order alternating between elements 186 and elements 196 with parallel arches 152 and 154 defining the spacing between elements 186 and 196 and forming closed passageways or channels 164 for fluid flow therethrough, and providing a flow of flue gas FG and combustion air CA therethrough to transfer heat from the flue gas FG to the combustion air CA prior to use of the combustion air CA in a combustion furnace.

In summary, a closed channel rotary regenerative air preheater 110 is provided that comprises element supporting baskets 132 each supporting a plurality of first heat transfer elements 186 arranged in an alternating order with a plurality of second heat transfer elements 196. The first heat transfer elements 186 are fabricated to comprise uniform alternating longitudinally parallel arches 192 and 194. The second heat transfer elements 196 are fabricated to comprise two uniform alternating longitudinally parallel adjacent arches 152 and 154 with an interval of longitudinally parallel uniform undulations 156 between each pair of adjacent arches 152 and 154. Uniform undulations 156 are angled with respect to the two adjacent arches 152 and 154. The adjacent arches 152 and 154 of the second heat transfer elements 196 define the spacing between the first heat transfer elements 186 and the second heat transfer elements 196, and serve to close passageways or channels 164 formed therebetween for fluid flow therethrough. A peak-to-peak height of the arches 192 and 194 of the first heat transfer elements 186 is depicted as Hu and a peak-to-peak height of the adjacent arches 152 and 154 of the second heat transfer elements 196 is depicted as Hs, with the ratio of Hu:Hs approximately 1:2.5 to approximately 1:4.0. Further, the arches 192 and 194 of the first heat transfer elements 186 are parallel to a main direction of flow of fluid, the adjacent arches 152 and 154 of the second heat transfer elements 196 are parallel to a main direction of flow of fluid, and the uniform undulations 156 of the second heat transfer elements 196 are angled at approximately 20 degrees to approximately 50 degrees with respect to the main direction of flow of fluid. Optionally, one or more of the adjacent arches 152 and 154 of the second heat transfer elements 196 may include one or more hips or ridges 152a, 154a for added strength.

A method of making a closed channel rotary regenerative air preheater 110 is also provided comprising providing a rotary regenerative air preheater 110 equipped with element supporting baskets 132, and fabricating from rigid material sheets first heat transfer elements 186 having uniform alternating longitudinally parallel arches 192 and 194, and sized for support within the element supporting baskets 132. Second heat transfer elements 196 are likewise fabricated from rigid material sheets to have two uniform alternating longitudinally parallel adjacent arches 152 and 154 with an interval of longitudinally parallel uniform undulations 156 between each such pair of adjacent arches 152 and 154. The second heat transfer elements 196 are also sized for support within the element supporting baskets 132. Once fabricated, the first heat transfer elements 186 and the second heat transfer elements 196 are arranged within the element supporting baskets 132 in an alternating order with the adjacent arches 152 and 154 of the second heat transfer elements 196 defining the spacing between the first heat transfer elements 186 and the second heat transfer elements 196. The adjacent arches 152 and 154 of the second heat transfer elements 196 likewise serve to close passageways or channels 164 between the first and second heat transfer elements 186 and 196 to form closed channels 164 for fluid flow therethrough. A peak-to-peak height of the arches 192 and 194 of the first heat transfer elements 186 is depicted as Hu and a peak-to-peak height of the adjacent arches 152 and 154 of the second heat transfer elements 196 is depicted as Hs, with the ratio of Hu:Hs approximately 1:2.5 to approximately 1:4.0. Furthermore, the arches 192 and 194 of the first heat transfer elements 186 are parallel to a main direction of flow of fluid, the adjacent arches 152 and 154 of the second heat transfer elements 196 are parallel to the main direction of flow of fluid, and the uniform undulations 156 of the second heat transfer elements 196 are angled at approximately 20 degrees to approximately 50 degrees with respect to the main direction of flow of fluid. Optionally, one or more of the adjacent arches 152 and 154 of the second heat transfer elements 196 may include one or more hips or ridges 152a and 154a for added strength.

Still further, a method of using a closed channel rotary regenerative air preheater 110 is provided comprising providing a rotary regenerative air preheater 110 equipped with element supporting baskets 132. Within the element supporting baskets 132, first heat transfer elements 186 having uniform alternating longitudinally parallel arches 192 and 194 are arranged in an alternating order with second heat transfer elements 196. The second heat transfer elements 196 have two uniform alternating longitudinally parallel adjacent arches 152 and 154 with an interval of longitudinally parallel uniform undulations 156 angled between each such pair of adjacent arches 152 and 154. Adjacent arches 152 and 154 of the second heat transfer elements 196 defining the spacing between the alternating first heat transfer elements 186 and second heat transfer elements 196. Also, adjacent arches 152 and 154 of the second heat transfer elements 196 close interior 162 to form closed passageways or channels 164 for fluid flow therethrough. As such, fluid flows through the closed passageways 164 to transfer heat from flue gas FG to air prior to use of the air as combustion air CA in a combustion furnace. A peak-to-peak height of the arches 192 and 194 of the first heat transfer elements 186 is depicted as Hu and a peak-to-peak height of the adjacent arches 152 and 154 of the second heat transfer elements 196 is depicted as Hs, with the ratio of Hu:Hs approximately 1:2.5 to approximately 1:4.0. The arches 192 and 194 of the first heat transfer elements 186 are parallel to a main direction of flow of fluid, the adjacent arches 152 and 154 of the second heat transfer elements 196 are parallel to the main direction of flow of fluid, and the uniform undulations 156 of the second heat transfer elements 196 are angled at approximately 20 degrees to approximately 50 degrees with respect to the main direction of flow of fluid. Optionally, one or more of the adjacent arches 152 and 154 of the second heat transfer elements 196 include one or more hips or ridges 152a and 154a for added strength.

While the subject air preheater 110 has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of this disclosure without departing from the essential scope thereof. Moreover, the use of the terms first, second, etc. do not denote any order or importance, but rather the terms first, second, etc. are used to distinguish one element from another. Therefore, it is intended that the disclosure not be limited to the particular embodiment disclosed as the best mode contemplated, but include all embodiments falling within the scope of the appended claims.

The invention claimed is:

1. A closed channel rotary regenerative air preheater comprising:
   element supporting baskets configured to rotate about a vertical axis, each element supporting basket supporting a discrete stack of a plurality of heat transfer elements resting in a parallel planar relationship along an entire length of each heat transfer element, said discrete stack of heat transfer elements comprising a plurality of first heat transfer elements and a plurality of second heat transfer elements, wherein the discrete stack of the plurality of heat transfer elements comprises an alternating order of one of the first heat transfer elements with one of the second heat transfer elements;
   each of the plurality of first heat transfer elements having a straight central first plane and being fabricated to comprise uniform alternating longitudinal first arches, the first arches being parallel to one another;
   each of the plurality of second heat transfer elements having a straight central second plane that is parallel to the straight central first plane, and each of the plurality of second heat transfer elements being fabricated to comprise a plurality of pairs of uniform alternating longitudinally adjacent opposing second arches relative to opposing sides of the second plane, the adjacent opposing second arches being parallel to one another, and an interval of longitudinally uniform undulations parallel to one another and angled at a non-zero angle with respect to the adjacent opposing second arches, the interval of longitudinally uniform undulations extending between each pair of adjacent opposing second arches, the interval of longitudinally uniform undulations being rigidity promoting features;

the adjacent opposing second arches of the second heat transfer elements defining a spacing between the first heat transfer elements and the second heat transfer elements;

each of the first arches of the first heat transfer element has an arcuate first apex and a concave segment on a first side of the first apex;

each of the adjacent opposing second arches of the second heat transfer element has an arcuate second apex and a convex segment on a second side of the second apex, the convex segment transitioning into a flat section configured at a non-zero angle relative to a line perpendicular to the straight central second plane, the flat section transitioning into the interval of longitudinally parallel uniform undulations; and each of the convex segments is nested in a respective one of the concave segments thereby defining a contact line therebetween, the contact line extending an entire length of the first heat transfer element and the second heat transfer element, adjacent pairs of the contact lines being spaced apart from one another by a linear distance along a common plane parallel to the straight central second plane thereby defining a closed passageway therebetween and between the first heat transfer element and the second heat transfer element for heat transfer fluid flow therethrough, and the contact lines for successive first and second heat transfer elements being aligned perpendicular to the first and second straight central planes.

2. The air preheater of claim 1, wherein a peak-to-peak height of the first arches of the first heat transfer elements is depicted as Hu and a peak-to-peak height of the adjacent opposing second arches of the second heat transfer elements is depicted as Hs, with the ratio of Hu:Hs approximately 1:2.5 to approximately 1:4.0.

3. The air preheater of claim 1, wherein the first arches of the first heat transfer elements are parallel to one another and to a main direction of flow of fluid, the adjacent opposing second arches of the second heat transfer elements are parallel to one another and to a main direction of flow of fluid, and the uniform undulations of the second heat transfer elements are parallel to one another and are angled with respect to the main direction of flow of fluid.

4. The air preheater of claim 1, wherein the first arches of the first heat transfer elements are parallel to one another and to a main direction of flow of fluid, the adjacent opposing second arches of the second heat transfer elements are parallel to one another and to a main direction of flow of fluid, and the uniform undulations of the second heat transfer elements are parallel to one another and are angled at approximately 20 degrees to approximately 50 degrees with respect to the main direction of flow of fluid.

5. The air preheater of claim 1, wherein one or more of the adjacent opposing second arches of the second heat transfer elements include one or more hips or ridges for added strength.

* * * * *